United States Patent [19]

Miyawaki et al.

[11] Patent Number: 6,008,301
[45] Date of Patent: Dec. 28, 1999

[54] POWDER PAINT COMPOSITION

[75] Inventors: Takahisa Miyawaki; Tsuyoshi Matsumoto; Mitsuyuki Mizoguchi; Masashi Seki, all of Kanagawa; Eiichi Kawasaki, Oita, all of Japan

[73] Assignee: Mitsui Chemicals, Inc., Japan

[21] Appl. No.: 08/969,760

[22] Filed: Nov. 13, 1997

[30] Foreign Application Priority Data

Nov. 21, 1996 [JP] Japan .................................. 8-310570

[51] Int. Cl.$^6$ ............................................... C08F 8/14
[52] U.S. Cl. ........................ 525/327.3; 525/370; 525/386
[58] Field of Search ................................ 525/327.3, 370, 525/386

[56] References Cited

U.S. PATENT DOCUMENTS 5,468,813 11/1995 Uenaka et al. ........................ 525/327.3

Primary Examiner—Bernard Lipman
Attorney, Agent, or Firm—Burns, Doane, Swecker & Mathis. LLP

[57] ABSTRACT

A thermosetting powder paint composition is disclosed which can realize simultaneous manifestation of I) excellent stability before film forming (in storage), II) excellent low temperature melting property/low temperature curing property in forming a film, and III) excellent film properties and physical properties after film forming;

and which comprises (A) a copolymer component which is obtained by radical polymerization in a reaction system containing (a-1) an ethylenically unsaturated monomer having a glycidyl group and a unsaturated double bond in the molecule, (a-2) styrene, and (a-3) the other monomer in a specific condition, (B) a curing agent component which is a linear acid anhydride of an aliphatic divalent carboxylic acid having a specific structure, and (C) a curing catalyst component having a specific structure.

8 Claims, No Drawings

POWDER PAINT COMPOSITION

BACKGROUND OF THE INVENTION

1. Field of the Invention

The present invention relates to a thermosetting powder paint composition, and more particularly, relates to a thermosetting powder paint composition which provides a baked film having excellent external characteristics (smoothness, sharpness and the like), physical properties (impact resistance, mar resistance, adhesion and the like), weatherability, ultraviolet ray resistance and chemical properties (acid resistance, solvent resistance and the like), provides a paint which is excellent in storage stability, and has low temperature melting property/low temperature curing property.

2. Description of the Related Art

[Trend of Investigation and Development in Technical Filed of Paint and Expectation for Powder Paint from the Viewpoints of Ecology and the Like]

A solvent-borne paint has been conventionally used for painting an article, and in order to be used in a field wherein strict qualities are required such as an automotive field, a paint satisfying various requirements has been developed and used.

Recently, in the technical field of paint, conversion to a powder paint from a solvent-borne paint has been expected, from the viewpoints of local or global environmental safeguards, improvement of occupational safety and hygiene environment, prevention of fire and explosion, saving resources and the like. According to historical and social requirements, with increase of expectation for high performance and variation of a powder paint, the powder paint has also been required to have high-grade film properties (for example, impact resistance, acid rain resistance and the like) corresponding to those of the solvent-borne paint.

Though the powder paint is thus required to have more strict film properties, a powder paint completely satisfying these requirements has not necessarily been commercially available.

[Technical Background of General Powder Paint]

As specific examples of a conventional-type powder paint, there are listed, for example, polyester resin powder paints and epoxy resin powder paints mainly composed of a bisphenol A. However, these paints have problems not only in weatherability but also in resistance to acid rain which has recently become an environmental problem. Therefore, these paints have problems when used outdoors like paints for automotive bodies.

[Technical Background of Acrylic Resin-based Powder Paint]

Japanese Patent Application Laid-Open (JP-A) No.49-34546 (1974) discloses a paint which is cured by reacting an acrylic resin component having a glycidyl group with an aliphatic dibasic acid (a curing agent component). However, the above-described powder paint does not necessarily have sufficient curing speed, therefore, high temperature and long time baking conditions are indispensable. And, a film formed from the above-described powder paint does not necessarily have sufficient physical properties such as solvent resistance, adhesion and the like.

In a technique like this by using no curing catalyst, crosslinking formation in forming a film is tried to be improved to attain low temperature melting/low temperature curing by increasing the amounts of functional groups (glycidyl groups in acrylic resin component; carboxyl groups in curing agent component) of a powder paint composition, however, the same problems as described above and the other problems are caused in this case.

Further, Japanese Patent Application Laid-Open (JP-A) No. Hei 5-112743(1993) discloses a powder paint comprising a resin component containing an acrylic resin synthesized from a system containing at least 20% by weight of a monomer containing a glycidyl group and 30 to 50% by weight of a styrene monomer. However, when the amount of styrene is over 30% by weight, the weatherability of a film deteriorates.

Further, Japanese Patent Application Laid-Open (JP-A) No. Hei 5-132634(1993) discloses a technique to form a film according to the same curing method as the prior art from a copolymer as an acrylic resin component synthesized from a system comprising a monomer containing a glycidyl group and tert-butyl acrylate or tert-butyl methacrylate, using as a curing agent component the same compounds as described in the above-described Japanese Patent Application Laid-Open No. Hei 5-112743. However, when tert-butyl acrylate or tert-butyl methacrylate is used as a monomer in an acrylic resin component, these may cause a side reaction with the other monomer having a glycidyl group and may be thermally decomposed when polymerized or desolvated in recovering, and a gel material which is a by-product of a unpreferable side reaction tends to be formed. When a film is formed from a powder paint composition containing such a gel material, an agglomerate tends to be formed non-uniformly on the surface of the film.

Further, U.S. Pat. Nos. 3,919,346 and 3,919,347 disclose a method to crosslink and cure a copolymer composed of a system containing a monomer having a glycidyl group and a monomer having a hydroxyl group as an acrylic resin component, using as a curing agent component an anhydride of a dicarboxylic acid. However, in this invention, storage stability of a paint is poor since the resin component having a glycidyl group and the curing agent composed of an anhydride of a dicarboxylic acid are used.

[Acrylic Resin-based Powder Paint Containing a Compound Having an Acid Anhydride as Curing Agent]

The technique disclosed in Japanese Patent Application Laid-Open (JP-A) No. 50-51542 is a method in which a copolymer constituted from a system containing 5 to 20% by weight of a monomer having a glycidyl group as an acrylic resin component is crosslinked and cured using a curing agent composed of a dicarboxylic acid or a linear acid anhydride. However, when a copolymer containing not more than 20% by weight of a monomer having a glycidyl group is used, the resulting film has insufficient crosslinking density and poor solvent resistance and weatherability.

To solve the problems of the above-described known techniques, a lot of investigations and developments have been carried out. U.S. Pat. No. 4,091,048 and Japanese Patent Application Publication (JP-B) No.58-2983(1983) disclose a paint obtained by crosslinking and curing 5 to 20% by weight of a copolymer containing a monomer having a glycidyl group and an acid anhydride. However, because the copolymer contains not more than 20% by weight of a monomer having a glycidyl group is used, the resulting film has insufficient crosslinking density, and the solvent resistance and weatherability are not necessarily sufficient all the same.

Especially, Japanese Patent Application Publication No. 58-2983 discloses a technique concerning a powder paint composition using a cyclic acid anhydride (a compound having a cyclic acid anhydride group) as a curing agent. Herein, the cyclic acid anhydride may be an aromatic compound or alicyclic compound. However, when the cyclic acid anhydride is used as a curing agent component, there are problems concerning low compatibility between the resin component and the curing agent component and low crosslinking efficiency between the resin component and the curing agent component.

EP 299,420 discloses a powder coating composition containing a modified polyacid anhydride curing agent, which is obtained by using an acrylic copolymer containing a glycidyl group, and a polyol modified polymeric polyacid anhydride wherein polymer chain has an acid anhydride bond and a plurality of acid functional groups and essentially no halogen atom, as a curing agent. However, when the polyol modified polymeric polyacid anhydride is used as a curing agent, hardness in baking is not sufficient and physical properties of the film such as solvent resistance and mar resistance are insufficient, and further, storage stability and the like of a paint are also insufficient.

EP 695,771 discloses a technique using a dicarboxylic acid (poly)anhydride modified with a polyisocyanate as a curing agent for an epoxy functional paint resin. However, when the curing agent is used, resistances such as weatherability and the like of the film are insufficient.

[Technical Background of Acrylic Resin-based Powder Paint Containing Curing Catalyst]

Japanese Patent Application Laid-Open (JP-A) No. 63-165463(1988) discloses a thermosetting acrylic resin powder paint composition mainly composed of a specific glycidyl group functional acrylic resin, aliphatic dibasic acid (anhydride) and alkyl titanate compound, which is melted and cured at low temperature and provides a film having excellent hardness, impact resistance, flex resistance and the like. Namely, there is disclosed a thermosetting acrylic resin powder paint mainly comprising (A) a glycidyl group-functional acrylic resin obtained by copolymerization of an alkyl ester of (meth)acrylic acid having 1 to 14 carbon atoms in the alkyl moiety with a glycidyl ester of (meth)acrylic acid as main components, (B) an aliphatic dibasic acid (preferably, adipic acid, sebacic acid, decanedioic acid, muconic acid and the like) or a linear acid anhydride thereof and (C) an alkyl titanate compound represented by the formula $Ti(OR)_4$ (wherein, R is an alkyl group having 15 to 20 carbon atoms) (for example, tetrapentadecyl titanate and the like).

Herein, the alkyl titanate compound is considered to have a function to catalyze crosslinking formation reaction between a resin component and a curing agent component at low temperature and has an effect to significantly manifest low temperature melting property/low temperature curing property when a film is formed from a powder paint composition. However, in the present invention, low temperature melting property/low temperature curing property, storage stability and the like are not necessarily sufficient.

Japanese Patent Application Laid-Open (JP-A) No. Hei 8-231893 discloses a thermosetting powder paint composition comprising (A) a glycidyl group-containing acrylic copolymer, (B) an aliphatic polyvalent carboxylic acid, and (C) a linear acid anhydride of an aliphatic polyvalent carboxylic acid, or further (D) a salt of a tert-amine compound with an organic acid and/or (E) a tert-amine compound having a melting point from 20 to 150° C.

However, also in this invention, storage stability and low temperature curing ability can not be admitted as sufficient. And when a salt of a tert-amine compound with an organic acid and/or a tert-amine compound having a melting point from 20 to 150° C. as a curing agent is used in a powder paint composition in which an aliphatic polyvalent carboxylic acid coexists as disclosed in Japanese Patent Application Laid-Open No. Hei 8-231893, under storage conditions of relatively high temperature and high humidity including a temperature of about 40° C. and a relative humidity of about 90%, there occurs problems such as gelling and poor appearance of a film due to high reactivity of a glycidyl group with a carboxyl group in storage. Further, there are problems such as remarkable yellowing of a film when baking is conducted at a more strict temperature than usual baking condition.

SUMMARY OF THE INVENTION

The present invention has been investigated in consideration of the above-described conventional problems.

One object of the present invention is to provide a thermosetting powder paint composition which can realize simultaneous manifestation of:

1) excellent stability before film forming (in storage),
2) excellent low temperature melting property/low temperature curing property in forming a film, and
3) excellent film properties and physical properties after film forming, which has not been accomplished by the conventional techniques.

A further object of the present invention is to provide a process for manufacturing well such an excellent thermosetting powder paint.

The first object of the present invention can be accomplished by a thermosetting powder paint composition for top coating comprising:

(A) a copolymer component which is obtained by radical polymerization in a reaction system containing
  (a-1) 20 to 60 parts by weight of an ethylenically unsaturated monomer having at least one glycidyl group and at least one unsaturated double bond in the molecule,
  (a-2) 1 to 30 parts by weight of styrene, and
  (a-3) 10 to 79 parts by weight of an ethylenically unsaturated monomer having neither carboxyl group nor tert-butyl ester group in the molecule, based on 100 parts by weight of the total amount of the monomers (a-1), (a-2) and (a-3);
(B) a curing agent component which is a linear acid anhydride of an aliphatic divalent carboxylic acid represented by the following general formula (1)

$$HO\text{—}[OC(CH)_mCOO]_n\text{—}H \tag{1}$$

wherein m and n each indicates independently a natural number providing m=4 ~20, n≧2; and
(C) a curing catalyst component composed of a compound represented by the following general formula (2)

$$R_jSnX_k \tag{2}$$

wherein j and k each indicates 0 or a natural number providing j+k=2, X is halogen, OH, OR', SR' or OCOR', R and R' each indicates independently an alkyl group or aryl group.

The further object of the present invention can be accomplished by a process for manufacturing a thermosetting powder paint by using the thermosetting powder paint composition of the present invention, which comprises:

a step of melting and kneading a raw material containing at least the copolymer component (A), the curing agent component (B) and the curing catalyst component (C); and a step of cooling and grinding the material after the step of melting and kneading.

The present invention is particularly peculiar in that it comprises the above-described components (A), (B) and (C) simultaneously, that it uses the component (A) having specific styrene content and that it uses the specific curing catalyst component (C), and higher action and effect can be manifested by controlling these components and composition thereof.

The thermosetting powder paint composition of the present invention is suitably applied to painting of a body of an automotive and parts of an automotive (aluminum wheel, wiper, pillar, door handle, fender, bonnet, air spoiler, stabilizer, front grill and the like), especially to top coating.

A film formed by the above-described top coating is required to have strict qualities concerning I) external characteristics (smoothness, sharpness and the like), II) physical properties (impact resistance, mar resistance, adhesion and the like), III) chemical properties (acid resistance, acid rain resistance, solvent resistance, pitch resistance and the like), and IV) weatherability and ultraviolet ray resistance.

The thermosetting powder paint composition of the present invention can fully suffice the requirements like that though it is a powder paint.

Further, the thermosetting powder paint composition of the present invention can manifest the above-described excellent ability even if it is applied on an water-borne base coat and baked.

BRIEF DESCRIPTION OF THE PREFERRED EMBODIMENTS

[Copolymer Component (A)]

In the present claims and specification, copolymers may be any one of random copolymers, alternating copolymers, block copolymers, graft copolymers and the like, and polymers may be any one of linear polymers, macrocyclic polymers, branched polymers, stellate polymers, three-dimensional network polymers and the like.

[Monomer (a-1)]

In the present invention, the monomer (a-1) having glycidyl group(s) and unsaturated double bond(s), which is copolymerized in the copolymer component (A), is not particularly restricted provided it is a compound substantially having glycidyl group(s) and unsaturated double bond (s) simultaneously.

The specific examples of the monomer (a-1) include glycidyl acrylate, glycidyl methacrylate, β-methylglycidyl acrylate, β-methylglycidyl methacrylate, N-glycidyl acrylic acid amide, allylglycidyl ether, glycidyl vinylsulfonate and the like. Among them, glycidyl acrylate, glycidyl methacrylate are preferred. These can be used alone or in combination of two or more.

The amount used of the monomer (a-1) is from 20 to 60 parts by weight, preferably from 25 to 50 parts by weight based on 100 parts by weight of the total amount of the monomers (a-1), (a-2) and (a-3). It is preferable that the amount used of the monomer (a-1) is not less than 20 parts by weight, since then the resulting film has high crosslinking density, and the film properties such as impact resistance, mar resistance, solvent resistance and the like are excellent. It is preferable that the amount used of the monomer (a-1) is not more than 60 parts by weight, since then film external characteristics such as smoothness, sharpness and the like are excellent.

[Monomer (a-2)]

The amount used of the styrene component (monomer (a-2)) copolymerized in the copolymer component (A) is in the range from 1 to 30 parts by weight, preferably from 10 to 30 parts by weight, and more preferably from 10 to 20 parts by weight based on 100 parts by weight of the total amount of the monomers (a-1)), (a-2) and (a-3). The styrene component contributes to the properties of a film such as gloss, smoothness and the like, and storage stability of a paint composition. When the amount used of the styrene component is less than 1 part by weight the, effect derived from styrene tends to decrease, and when over 30 parts by weight, weatherability of a film tends to decrease.

[Monomer (a-3)]

As the ethylenically unsaturated monomer (a-3) copolymerized in the copolymer component (A), which is different from the monomers (a-1) and (a-2), a radical-polymerizable monomer substantially having neither a carboxyl group nor a tert-butyl ester group and having a unsaturated group can be used, and this monomer can be used alone or in combination.

The specific examples of the monomer (a-3) include carboxylates, unsaturated hydrocarbons, nitriles, amides and the like, and among them, carboxylates are preferable and esters of primary or secondary alcohol with acrylic acid or methacrylic acid are more preferable.

The specific examples of the esters of primary or secondary alcohol with acrylic acid or methacrylic acid include ethylenically unsaturated monomers including acrylic acid derivatives such as methyl acrylate, ethyl acrylate, propyl acrylate, isopropyl acrylate, butyl acrylate, isobutyl acrylate, 2-ethylhexyl acrylate, dodecyl acrylate, stearyl acrylate, cyclohexyl acrylate, benzyl acrylate, phenyl acrylate, hydroxyethyl acrylate, hydroxypropyl acrylate, hydroxybutyl acrylate, 1,4-butanediol monoacrylate and dimethylaminoethyl acrylate; methacrylic acid derivatives such as methyl methacrylate, ethyl methacrylate, propyl methacrylate, isopropyl methacrylate, butyl methacrylate, isobutyl methacrylate, 2-ethylhexyl methacrylate, dodecyl methacrylate, stearly methacrylate, cyclohexyl methacrylate, benzyl methacrylate, phenyl methacrylate, hydroxyethyl methacrylate, hydroxypropyl methacrylate, hydroxybutyl methacrylate, 1,4-butanediol monomethacrylate and dimethylaminoethyl methacrylate; vinyl esters such as vinyl acetate, vinyl propionate and the like; dicarboxylates of maleic acid, itaconic acid and the like; unsaturated hydrocarbons such as α-methylstyrene, vinyltoluene, t-butylstyrene, vinylanisole, vinylnaphthalene, divinylbenzene, chlorostyrene and the like; nitriles such as acrylonitrile, methacrylonitrile and the like; amides such as acrylamide, methacrylamide, vinylamide, N-methylolacrylamide, N-methylolmethacrylamide, diacetoneacrylamide, diacetonemethacrylamide and the like; halogenized ethylenically unsaturated monomers such as vinyl chloride, vinylidene chloride, vinyl fluoride, monochlorotrifluoroethylene, tetrafluoroethylene, chloroprene and the like; ethylene; propylene; isoprene; butadiene; α-olefin or dienes having 4 to 20 carbon atoms; alkylvinyl ethers such as laurylvinyl ether and the like; nitrogen-containing vinyls such as vinylpyrrolidone, 4-vinylpyrrolidone and the like. These can be used alone or in combination.

The amount used of the monomer (a-3) is from 10 to 79 parts by weight, preferably from 10 to 70 parts by weight, and more preferably from 30 to 65 parts by weight based on 100 parts by weight of the total amount of the monomers (a-1), (a-2) and (a-3).

[Copolymerization]

In copolymerization of the copolymer component (A), when a compound having a carboxyl group such as acrylic acid, methacrylic acid, maleic acid, itaconic acid and the like is used as the monomer (a-3), gelling occurs in the polymerization and an agglomerate is formed on a film after film forming, in general. Therefore, they are not preferable as the monomer (a-3).

In copolymerization of the copolymer component (A), when t-butyl (meth)acrylate is used as the monomer (a-3), usually, decomposition of the t-butyl group of the copolymer component (A) is caused due to heating in desolvating and preparing a paint composition, a carboxyl group is produced and the same problems as described above may sometimes occur.

The glass transition point (Tg) of the copolymer component (A) calculated according to the Fox formula is preferably from about 20 to about 100° C., more preferably from about 30 to about 90° C., and most preferably from 50 to 80° C. When Tg is not more than 20° C., storage stability of a paint composition tends to improve.

[Calculation of Glass Transition Point—Evaluation of Glass Transition Point (Tg) of Heteropolymer]

The glass transition point (Tg) of a polymer having a specific monomer composition can be calculated according to the Fox formula. The fox formula is a formula for calculating Tg of a copolymer based on Tg of a homopolymer of each monomer constituting the copolymer, and the detail thereof is described in Bulletin of the American Physical Society, Series 2, volume 1, No. 3, p 123 (1956).

Tg of various ethylenically unsaturated monomers which are used for evaluating Tg of a copolymer according to Fox formula are described, for example, in Table 10-2 (main raw material monomer of acrylic resin for painting) in New High Polymer Library, volume 7, Painting Synthetic Resin Handbook (Kyozo Kitaoka ed., High Polymer Publisher, Kyoto, 1974) pp 168 to 169. All of this description can be regarded as a part of the disclosure of the specification of the present application by clearly expressing cited literature and cited scope, and the description is also regarded as a matter or disclosure understood directly as one meaning by a person skilled in the art, by referring the clearly expressed cited scope in view of the matter or the disclosure described in the specification of the present application.

[Synthesis Method for Copolymer Component (A)]

The synthesis method for the copolymer component (A) is not particularly restricted provided a copolymer having substantially desired properties is obtained.

The copolymer component (A) can be synthesized by known and public-used usual methods, and can be prepared by radical polymerization methods including a solution polymerization method, emulsion polymerization method, suspension polymerization method and bulk polymerization method. In particular, the solution polymerization method is suitably used.

[Molecular Weight of Copolymer Component (A)]

To regulate the molecular weight of the copolymer component (A), for example, polymerization is conducted in the presence of mercaptans such as dodecylmercaptan and the like, disulfides such as dibenzoylsulfide and the like, alkyl esters of thioglycolic acid having 1 to 18 carbon atoms in the alkyl moiety such as 2-ethylhexyl thiglycolate, chain transfer agents composed of halogenized hydrocarbons such as urea tetrabromide, organic solvents having high chain transfer effect such as isopropyl alcohol, isopropyl benzene, toluene and the like.

The number average molecular weight of the copolymer component (A) is preferably from about 1000 to 30000, more preferably from about 2000 to 20000, and most preferably from about 2500 to about 6000. It is preferable that the number average molecular weight is about 1000 or more, since then storage stability of a paint composition is generally excellent.

The number average molecular weight of the copolymer component (A) is evaluated by gel permeation chromatography (GPC) using polystyrene as a standard.

[Curing Agent Component (B)]

In the present invention, the linear acid anhydride of an aliphatic divalent carboxylic acid is not particularly restricted provided it is substantially an acid anhydride of a linear oligo or polyaliphatic compound having at least two carboxyl groups and/or acid anhydride groups substantially existing in the molecule, and this linear acid anhydride may be used alone or in combination of two or more.

Sometimes, an aliphatic polyvalent carboxylic acid such as an aliphatic divalent carboxylic acid and the like may remain as an impurity in the linear acid anhydride composition. This impurity may remain in an amount which does not exert bad influence on the thermosetting powder paint composition.

The linear acid anhydride of an aliphatic divalent carboxylic acid is preferably prepared to have a melting temperature in the range from about 40 to about 150° C. In general, when the melting temperature of the linear acid anhydride of an aliphatic divalent carboxylic acid is about 40° C. or more, blocking resistance of a paint composition tends to increase. Further, in general, when the melting temperature of the linear acid anhydride of an aliphatic divalent carboxylic acid is not more than 150° C., thermal flowability tends to increase, and external characteristics such as smoothness and the like of the resulting film tend to increase.

The linear acid anhydride of an aliphatic divalent carboxylic acid is represented by the following formula (1):

$$HO\text{—}[OC(CH)_mCOO]_n\text{—}H \qquad (1)$$

wherein m and n each indicates independently a natural number providing m=4~20, n≧2.

The upper limit of n is preferably about 20.

The specific examples of the linear acid anhydride of an aliphatic divalent carboxylic acid include linear condensates of aliphatic divalent carboxylic acids derived by dehydration condensation from at least one compound selected from aliphatic divalent carboxylic acids such as succinic acid, adipic acid, azelaic acid, sebacic acid, eicosanedioic acid, dodecanedioic acid and the like. Among them, dehydrated linear condensates of azelaic acid, sebacic acid, dodecanedioic acid and eicosanedioic acid are more preferred.

As the linear acid anhydride of an aliphatic divalent carboxylic acid, there can be also used linear acid anhydrides derived by dehydration condensation from two or more aliphatic divalent carboxylic acids.

[Linear Acid Anhydride of Aliphatic Divalent Carboxylic Acid]

The concept of the term "linear acid anhydride of an aliphatic divalent carboxylic acid" include "polymeric polyanhydride", "polymeric polyanhydride containing anhydride linkages in the polymeric backbone" and "polyanhydride of aliphatic carboxylic acids" and the like.

It is not usually preferable to react the copolymer component (A) with a cyclic acid anhydride of a polyvalent carboxylic acid such as succinic anhydride and phthalic anhydride, since such a cyclic acid anhydride reacts only with an epoxy group of a specific glycidyl group in the copolymer component (A) at high probability and therefore the effect to crosslink a plurality of the copolymer components (A) is low.

The concepts of the terms "anhydride", "anhydride group", "anhydride bond" and "polyanhydride" include also concepts regarding respective terms described in the paragraph "Polyanhydride" in "MARUZEN Concise Encyclopedia of Polymer Science and Engineering (Kroschwitz ed., Tatsu Mita translated, Maruzen, Tokyo, 1994)" pp 996 to 998. All of this description can be regarded as a part of the disclosure of the specification of the present application by clearly expressing cited literature and cited scope, and the description is also regarded as a matter or disclosure understood directly as one meaning by a person skilled in the art, by referring the clearly expressed cited scope in view of the matter or the disclosure described in the specification of the present application.

Polyanhydrides have been intensively studied by research at MIT and noticed in the early 1980 when investigation and development of biodegradable (medical) polymer materials and application thereof for drug delivery system were flourishing.

The linear acid anhydride of an aliphatic divalent carboxylic acid can be synthesized, for example, by a melt polycondensation method, solution polycondensation method, interfacial polycondensation method and the like.

Regarding the amount used of the linear acid anhydride of an aliphatic divalent carboxylic acid, the total amount of a carboxyl group and acid anhydride group existing in the molecule of the linear acid anhydride of an aliphatic divalent carboxylic acid is preferably from about 0.5 to about 2.0 equivalent, and more preferably from about 0.7 to about 1.2 equivalent based on one equivalent of a glycidyl group in the copolymer component (A). When the amount used of the linear acid anhydride of an aliphatic divalent carboxylic acid is in the above-described range, the resulting film has excellent appearance, and excellent properties such as solvent resistance, impact resistance, weatherability and the like.

[Curing Catalyst Component (C))]

The curing catalyst component (C) is not particularly restricted provided when it is used together with the copolymer component (A) and the curing agent component (B), there is substantially obtained a paint which provides a film having excellent physical properties, of which baking conditions include lower temperature and shorter time as compared with a paint obtained by using no component (C), without impairing the storage stability.

In the present invention, the curing catalyst component (C) is composed of a compound represented by the following general formula (2):

$$R_jSnX_k \quad (2)$$

wherein j and k each indicates 0 or a natural number providing j+k=2, X is halogen, OH, OR', SR' or OCOR', R and R' each indicates independently an alkyl group or aryl group,
and the compound can be used alone or in combination of two or more. When the R and R' each indicates an alkyl group, the number of carbon atom thereof is preferably from about 6 to about 18.

The preferable examples of the above-described compound include tin(II) hexanoate, tin(II) octanoate, tin(II) laurate, tin(II) stearate, tin(II) 2-ethylhexanoate, tin(II) chloride, tin(II) bromide and the like.

The more preferable examples thereof include tin(II) hexanoate, tin(II) octanoate, tin(II) laurate, tin(II) stearate and the like.

The other specific examples of curing catalysts include quaternary ammonium salt-based compounds, phosphonium salt-based compounds, phosphine-based compounds, imidazole-based compounds, amine-based compounds and melamine-based compounds. However, these compounds may sometimes have problems concerning storage stability of a powder paint composition and film properties (external characteristics such as smoothness and the like) depending on conditions of the powder paint composition.

The curing catalyst component (C) used in the present invention shows little cure promoting effect in storage of a powder paint, and has excellent storage stability (chemical stability) of the powder paint, and get, shows remarkable cure promoting effect at a baking temperature of the powder paint of 100° C. or more.

In general, the amount used of the curing catalyst component (C) is preferably from about 0.005 to about 3 parts by weight, and more preferably from about 0.01 to 2 parts by weight based on 100 parts by weight of the total amount of the copolymer component (A) and the curing component (B). When the amount used of the curing catalyst component (C) is not more than 3 parts by weight, in general, storage stability of a paint composition is excellent, curing speed is appropriate, and smoothness of a film and storage stability of a paint are maintained.

[Feature of Curing Catalyst Component (C)]

The curing catalyst component (C) is peculiar in that storage stability of a paint is not lost at severe conditions such as a temperature of 40° C. and a relative humidity of 90% or more, and that when the temperature of the component (C) reaches the baking temperature range, it manifests cure promoting effect remarkably. When tertiary amines or metal salts of carboxylic acids such as sodium octanoate and calcium stearate disclosed in Japanese Patent Application Laid-Open Nos. Hei 5-112743 and 5-132634 are used as curing catalysts together with the above-described components (A) and (B), it is difficult to satisfy both low temperature melting property/low temperature curing property and storage stability.

[Additive]

In the present invention, various additives usually added to a paint can be used.

For example, in the thermosetting powder paint composition of the present invention, there can also be appropriately blended a synthetic resin composition comprising an epoxy resin, polyester resin, polyamide and the like, a natural resin comprising a fibrin, fibrin derivative or the like, or a semi-synthetic resin composition according to the object, to improve film appearance or film physical properties.

For example, in the thermosetting powder paint of the present invention, there can also be appropriately blended additives such a pigment, flowability controlling agent, thixotropic agent (thixotropy controlling agent), electrification controlling agent, surface controlling agent, brightener, antiblocking agent, plasticizer, ultraviolet ray absorber, anti-popping/pinhole agent, antioxidant and the like according to the object.

[Regarding Kneading of Powder Paint Composition]

When a composition containing the components (A) and (B) or the components (A), (B) and (C) is mechanically kneaded, the temperature is not particularly restricted provided a substantially uniform powder paint composition can be prepared at the temperature.

As the melt kneading apparatus, a heat roller, heat kneader, extruder and the like are usually used.

As the concrete example for blending the thermosetting powder paint composition of the present invention, there can be adopted, but not limited to, a method in which kneading machine or mixing machine such as a roller, kneader, mixer (Banbury type, transfer type and the like), calender equipment, extruder and the like are appropriately combined, conditions of respective processes (temperature, melted or not melted, revolution, vacuum atmosphere, inert gas atmosphere and the like) are appropriately set, fully uniform mixing is conducted, then a powder paint composition of uniform fine particle condition is obtained by a grinding machine.

As one embodiment of mixing and kneading process in which additives and the like are added to the powder paint composition of the present invention, to the thermosetting powder paint composition of the present invention are optionally added additives such as a antiblocking agent, surface controlling agent, plasticizer, electrification controlling agent, pigment, filler, bulking agent and the like, the resulting mixture is fully melted and kneaded at a temperature from about 40 to about 130° C., cooled, then uniformly ground to obtain suitable grit (usually, not more than about 100 mesh) to give a powder paint.

[Painting Method and Baking Method]

The powder paint obtained by grinding is adhered to a painting object, heated and thermally cured to form a film.

As a concrete example of a method for coating the thermosetting powder paint composition of the present invention, for example, known painting methods such as electrostatic coating method, flow immersion method and the like are listed When the thermosetting powder paint composition of the present invention is used as a top coating paint, the resulting film after baking has excellent properties even if a waterborne base coat is used as a primer thereof, like when a conventional solvent-borne paint is used as a primer.

Namely, a water-borne base coat (including pigment containing and/or metal powder containing paints) is coated, dried for given time, then the thermosetting powder paint composition of the present invention is adhered on the primer paint according to the above-described method, heated and thermally cured to form a film.

The baking of the thermosetting powder paint composition of the present invention can be conducted at a temperature usually from about 100 to about 200° C., preferably from about 100 to about 160° C., more preferably from 120 to 150° C. for usually from about 10 about 60 minutes, to carry out the crosslinking reaction of the copolymer component (A) with the curing agent component (B). After baking, the composition is cooled to room temperature to obtain a film having excellent properties.

A coating method which can be applied to the thermosetting powder paint composition of the present invention can be used for a body of an automotive or parts of an automotive, especially it is very useful for topcoating of a body of an automotive or parts of an automotive.

[Concept of Term "derivative"]

The concept of term "derivative" used in the present claims and the specification include compounds obtained by substituting a hydrogen atom of a specific compound with the other atom or atom group Z.

Herein, Z is a monovalent hydrocarbon group containing at least one carbon atom, and more specifically, an aliphatic group, alicyclic group of which aromatic content is substantially low, group formed by combining them, or may be a residual group formed by bonding a hydroxyl group, carboxyl group, amino group, nitrogen, silicon sulfide, phosphorus and the like to them, and among them, groups having narrowly defined aliphatic structure are preferable.

Z may be, for example, a group derived from the above-described groups by substitution with a hydroxyl group, alkyl group, cycloalkyl group, allyl group, alkoxyl group, cycloalkoxyl group, allyloxyl group, halogen (F, Cl, Br and the like) group and the like.

By suitably selecting these substituents, it is possible to control various properties of a film formed from the powder paint composition of the present invention.

[Concept of Term "Storage Stability"]

The concept of term "storage stability" used in the present claims and the specification include physical stability (blocking resistance) and chemical stability (solid phase reaction resistance) of a powder paint.

In this specification, examples, preparation examples and embodiments are only for assisting understanding of the content of the present invention, and are not to be construed to limit the scope thereof. In the descriptions, all "parts" and "%" are by weight unless otherwise stated.

[Preparation Example 1] Preparation of Copolymer Components (A-1) to (A-5)

Into a four-necked flask equipped with a stirrer, thermometer, reflux condenser and nitrogen introducing tube was charged 66.7 parts of xylene, and the mixture was heated up to the reflux temperature with stirring. After reaching the reflux temperature, monomers shown in Table 1 and t-butyl peroxy-2-ethylhexanoate (trade name: Perbutyl O, manufactured by NOF Corp.) as a polymerization initiator were added dropwise over 5 hours, then kept for further one hour, and 0.5 parts of Perbutyl O was added dropwise at 100° C. and kept for 2 hours. The solvent was removed from the resulted polymerization solution to obtain a copolymer component (A-1).

The kinds and composition of monomers were changed as shown in Table 1 to obtain various copolymer components (A-2) to (A-5).

The physical properties of the copolymers were measured according to the following method.

(1) Glass transition temperature (Tg); It was calculated according to Fox formula based on the monomer composition.

(2) Number average molecular weight (Mn); It was measured by GPC using polystyrene as a standard.

TABLE 1

| | Preparation Example 1: Preparation of copolymer components (A-1) to (A-5) | | | | |
| --- | --- | --- | --- | --- | --- |
| | A-1 | A-2 | A-3 | A-4 | A-5 |
| ST | 10.0 | 20.0 | — | 45.0 | 10.0 |
| MMA | 39.3 | 32.1 | 43.5 | 10.6 | — |
| nBMA | 10.7 | — | 16.5 | 4.4 | — |
| iBMA | — | 17.9 | — | — | 75.0 |
| GMA | 40.0 | 30.0 | 40.0 | 40.0 | 15.0 |
| PB-O | 4.0 | 3.8 | 3.5 | 4.2 | 3.8 |
| Tg | 70 | 71 | 65 | 75 | 65 |
| Mn | 3200 | 2700 | 2800 | 3800 | 2500 |

NOTE:
ST: styrene
MMA: methyl methacrylate
nBMA: n-butyl methacrylate
iBMA: iso-butyl methacrylate
GMA: glycidyl methacrylate
PB-O: t-butylperoxy-2-ethyl hexanoate

[Preparation Example 2] Preparation of Linear Acid Anhydride of Aliphatic Divalent Carboxylic Acid One mol of dodecanedioic acid and 0.8 mol of acetic anhydride were charged in a reaction vessel, the mixture was heated up to 150° C., and reacted for 5 hours with removing the resulting acetic acid through a vacuum line so that acetic anhydride did not flow out of the system. Then, the mixture was immediately cooled to recover a white solid to obtain a linear acid anhydride. The melting point of this compound was from 73 to 82° C.

Further, a linear acid anhydride of sebacic acid having a melting point from 72 to 81° C. was obtained in the same manner as described above using sebacic acid. The other linear carboxylic anhydrides were produced in the same manner.

[Evaluation of Property]

The powder paints obtained in the Examples and Comparative Examples described bellow were evaluated according to the following methods.

(1) Smoothness

Appearance of a film was observed, and particularly excellent smoothness is evaluated as ⊚, slight unevenness is evaluated as ○, and poor smoothness is evaluated as X.

(2) Sharpness

A film was evaluated according to GM 91013 using DOI meter (manufactured by Paul N. Gardner). DOI of 90 to 100 is evaluated as excellent sharpness as ⊚, DOI of 70 to 90 is evaluated as ○, and DOI of less than 70 is evaluated as poor sharpness as X.

(3) Gloss

It is shown by a measured value (60° gloss) by a gloss-meter.

(4) Impact Resistance Test (Du Pont Impact Test)

It was conducted according to JIS K5400 6. 13. 3. The weight used here was 500 g. The evaluation result is shown by a numerical value representing a dropping height at which crack or peeling occurred in a film.

(5) Adhesion

It was measured by Erichsen tester, and a value (mm) at which a film was peeled is shown.

(6) Solvent Resistance

The surface of a film was subjected to 50 times reciprocative rubbing treatment with gauze impregnated with xylol. No trace is evaluated as ⊚, slight trace is evaluated as ○, and trace is evaluated as X.

(7) Mar Resistance

The surface of a film was rubbed with a brush using a 0.3% cleanser suspension, and gloss was evaluated before and after the rubbing and gloss retention was calculated. The gloss retention of 60% or more is evaluated as mar resistant the gloss retention from 50 to 60% is evaluated as ○, the gloss retention from 40 to 50% is evaluated as Δ, and the gloss retention of not more than 40 is evaluated as no mar resistance as X.

(8) Weatherability

An acceleration test of 4000 hours was conducted using QUV tester, gloss (60°) was measured before and after the acceleration test, and gloss remaining ratio (%) was calculated. The gloss remaining ratio is calculated according to the following formula.

$$\text{Gloss remaining ratio } (\%) = \frac{(60° \text{ gloss after acceleration test})}{(60° \text{ gloss before acceleration test})} \times 100$$

The gloss remaining ratio of 80% or more is evaluated as ⊚, the gloss remaining ratio of 70 to 80% is evaluated as ○, and the gloss remaining ratio of not more than 60% is evaluated as X.

(9) Storage stability test-1 of powder paint (blocking resistance test)

A powder paint was stored at a temperature of 40° C. and a relative humidity of 90% for 14 days, and was observed visually and by touch. As a result, completely no abnormality is evaluated as ⊚, somewhat inferior is evaluated as ○, and inferior is evaluated as X.

(10) Storage Stability Test-1 of Powder Paint (Solid Phase Reaction Resistance Test)

A powder paint was stored at the above-described conditions, then, 0.3 g of a pellet composed of the powder paint having a size of 10 mm φ was prepared. This pellet was pasted on a plate, the plate was stood straight, and the pellet was baked at 140° C. for 30 minutes and sagging condition thereof was measured. Sagging of 150 mm or more is evaluated as excellent solid phase reaction resistance as ⊚, sagging of 100 to 150 mm is evaluated as ○, and sagging of not more than 100 mm is evaluated as X.

(11) Yellowing Resistance Test of Film

A powder paint was coated on a white acrylic base coat, baked at 140° C. for 30 minutes or at 150° C. for 60 minutes, and yellowing condition of the film was measured by a color difference meter (manufactured by Tokyo Denshoku Co., Ltd.). Namely, color difference (ΔE=delta E) against the white acrylic base coat without powder paint coating was calculated. Lower number indicate more excellent yellowing resistance of the film.

EXAMPLES 1 to 8, AND COMPARATIVE EXAMPLES 1 to 13

[Preparation of Powder Paint]

A copolymer component (A), a curing agent component (B) and a curing catalyst component (C) were mixed in the ratio shown in Tables 2 and 3, and 1 part by weight of RESIMIX RL-4 (trade name: manufactured by Mitsui Toatsu Chemicals, Inc., acrylic resin having low viscosity, that is flowability controlling agent), 1 part by weight of TINUVIN 144 (manufactured by Ciba Geigy Corp., photo stabilizer), 1 part by weight of benzoin (anti-popping/pinhole agent) and 2 parts by weight of TINUVIN 900 (manufactured by Ciba Geigy Corp., ultraviolet ray absorber) were added based on 100 parts by weight of the total amount of the components (A) and (B), and they were uniformly mixed. This mixture was melted and kneaded at a temperature of 60° C. using a biaxial extruder, cooled, then finely ground by a grinder, and fractions which passed a 150 mesh sieve were recovered to give a powder paint.

[Preparation of Base-treated Steel Plate]

A black paint composed of a crosslinked polyester-melamine resin was coated on a 0.8 mm thick satin finished steel plate which had been treated with zinc phosphate to form a film having a thickness of 20 μm, then baked to prepare a base-treated steel plate.

[Preparation, Coating and Baking of Test Plate]

The powder paints obtained in the Examples and Comparative Examples were electrostatically coated on the above-described base-treated steel plate to form a film having a thickness of 60 to 70 μm, then baked at 140° C. for 30 minutes to obtain a test plate.

The powder paints and films formed in Examples 1 to 8 were evaluated. The results are shown in Tables 4 and 6. Further, corresponding powder paints and films formed in Comparative Examples 1 to 13 were evaluated. The results are shown in Tables 5 and 7.

The powder paints of Examples 1 to 8 shown in Table 2 are included in the range of the present claims. Examples 1 to 8 provide experiments in which the kind of the curing agent component (B) and the kind and weight of the curing catalyst component (C) were changed. The results show that each film had excellent appearance, physical properties and weatherability and each paint composition had excellent storage stability.

Comparative Examples 1 and 3 are examples in which no curing catalyst was used. Baking of each film was insufficient and the film had poor physical properties and weatherability.

Comparative Examples 1 and 2 are examples in which an aliphatic divalent carboxylic acid was used as a curing agent. Each film had poor appearance and mar resistance.

Comparative Example 4 is an example in which a copolymer containing no styrene was used. The film had poor appearance and the paint had poor storage stability.

Comparative Example 5 is an example in which a copolymer containing excess styrene was used. The film had poor weatherability.

Comparative Example 6 is an example in which the amount of glycidyl group of a copolymer was outside the range of the present invention. Because the amount of the glycidyl group was too low, the film had poor physical properties and weatherability.

Comparative Example 7 is an example in which an aromatic acid anhydride was used as a curing agent. In this example, various abilities were poor.

Comparative Examples 8 and 9 are examples in which a metal salt of a carboxylic acid which was outside the present invention was used. In each case, the film had poor mar resistance and weatherability.

Comparative Examples 10 and 11 are examples in which an amine-based compound or salt thereof which was outside the present invention was used as a curing catalyst. In each case, the paint had poor storage stability and yellowing resistance in excess heating.

Comparative Example 12 is an example in which tetrapentadecyl titanate was used as a component of a paint. The paint had poor storage stability.

Comparative Example 13 is an example in which dibutyl tin dilaurate which was outside the present invention was used as a curing agent. In this example, cure promotion was insufficient and solvent resistance and mar resistance were poor.

TABLE 2

Paint compositions in Examples 1 to 8

| | Copolymer (A) | Curing Agent (B) | Catalyst (C) |
|---|---|---|---|
| Ex. 1 | A-1 (67.6) | DDA anhydride (32.4 = 1.0 eq.) | SO (0.5) |
| Ex. 2 | A-1 (67.6) | DDA anhydride (32.4 = 1.0 eq.) | SS (0.5) |
| Ex. 3 | A-1 (69.1) | DDA anhydride (30.9 = 0.8 eq.) | SO (0.5) |
| Ex. 4 | A-2 (73.3) | DDA anhydride (26.7 = 1.0 eq.) | SO (0.5) |
| Ex. 5 | A-1 (67.6) | DDA anhydride (32.4 = 1.0 eq.) | SO (0.1) |
| Ex. 6 | A-1 (67.6) | DDA anhydride (32.4 = 1.0 eq.) | SO (1.0) |
| Ex. 7 | A-1 (71.7) | Sebacic anhydride (28.3 = 1.0 eq.) | SO (0.5) |
| Ex. 8 | A-1 (71.7) | Sebacic anhydride (28.3 = 1.0 eq.) | SS (0.5) |

Note:
DDA anhydride: dehydrated condensate of dodecanedioic acid
Sebacic anhydride: dehydrated condensate of sebacic acid
SO: tin(II) octanoate
SS: tin(II) stearate

TABLE 3

Paint compositions in Comparative Examples 1 to 13

| | Copolymer (A) | Curing Agent (B) | Catalyst (C) |
|---|---|---|---|
| Comp. Ex. 1 | A-1 (76.8) | DDA (23.2 = 1.0 eq.) | — |
| Comp. Ex. 2 | A-1 (76.8) | DDA (23.2 = 1.0 eq.) | SO (0.5) |
| Comp. Ex. 3 | A-1 (67.6) | DDA anhydride (32.4 = 1.0 eq.) | — |
| Comp. Ex. 4 | A-3 (67.6) | DDA anhydride (32.4 = 1.0 eq.) | SO (0.5) |
| Comp. Ex. 5 | A-4 (67.6) | DDA anhydride (32.4 = 1.0 eq.) | SO (0.5) |
| Comp. Ex. 6 | A-5 (85.8) | DDA anhydride (14.2 = 1.0 eq.) | SO (0.5) |
| Comp. Ex. 7 | A-1 (74.5) | terephthalic anhydride (25.5 = 1.0 eq.) | SO (0.5) |
| Comp. Ex. 8 | A-1 (67.6) | DDA anhydride (32.4 = 1.0 eq.) | DSO (0.5) |
| Comp. Ex. 9 | A-1 (67.6) | DDA anhydride (32.4 = 1.0 eq.) | CS (0.5) |
| Comp. Ex. 10 | A-1 (67.6) | DDA anhydride (32.4 = 1.0 eq.) | M-2HT (0.5) |
| Comp. Ex. 11 | A-1 (67.6) | DDA anhydride (32.4 = 1.0 eq.) | DBU-Fa (0.5) |
| Comp. Ex. 12 | A-1 (67.6) | DDA anhydride (32.4 = 1.0 eq.) | TPT (0.5) |
| Comp. Ex. 13 | A-1 (67.6) | DDA anhydride (32.4 = 1.0 eq.) | DTL (0.5) |

Note:
DDA: dodecanedioic acid
DDA anhydride: dehydrated condensate of dodecanedioic acid
Terephthalic anhydride: dehydrated condensate of terephthalic acid
SO: tin(II) octanoate
DSO: sodium octanoate
CS: calcium stearate
M-2HT: ARMEEN M-2HT (amine-based catalyst, manufactured by Lion Akzo K.K.)
DBU-Fa: DBU formate (an amine salt formed from 1,8-diaza-bicyclo acid [5, 4, 0] undecene-7 and formic acid)
TPT: tetrapentadecyl titanate
DTL: dibutyl tin(IV) dilaurate

TABLE 4

Evaluation results -(1) in Examples 1 to 8

| | Smoothness | Sharpness | Gloss | Impact Resistance | Adhesion | Solvent Resistance | Mar Resistance |
|---|---|---|---|---|---|---|---|
| Ex. 1 | ◎ | ◎ | 95 | 50< | 8< | ◎ | ◎ |
| Ex. 2 | ◎ | ◎ | 93 | 45 | 8< | ◎ | ◎ |
| Ex. 3 | ◎ | ◎ | 96 | 50< | 8< | ◎ | ◎ |
| Ex. 4 | ○ | ○ | 85 | 45 | 7.0 | ◎ | ◎ |
| Ex. 5 | ○ | ○ | 86 | 45 | 7.0 | ◎ | ◎ |
| Ex. 6 | ◎ | ○ | 85 | 50< | 7.0 | ◎ | ◎ |
| Ex. 7 | ◎ | ◎ | 96 | 50< | 8< | ◎ | ◎ |
| Ex. 8 | ◎ | ○ | 90 | 50< | 7.5 | ◎ | ◎ |

TABLE 5

Evaluation results - (1) in Comparative Examples 1 to 13

| | Smoothness | Sharpness | Gloss | Impact Resistance | Adhesion | Solvent Resistance | Mar Resistance |
|---|---|---|---|---|---|---|---|
| Comp. Ex. 1 | ○ | ◎ | 90 | 20 | 2.0 | X | X |
| Comp. Ex. 2 | Δ | X | 76 | 30 | 4.5 | ○ | Δ |
| Comp. Ex. 3 | ◎ | ○ | 83 | 30 | 4.0 | X | Δ |
| Comp. Ex. 4 | ○ | ○ | 78 | 45 | 8< | ◎ | ◎ |
| Comp. Ex. 5 | ◎ | ◎ | 92 | 50< | 8< | ◎ | ◎ |
| Comp. Ex. 6 | ◎ | ◎ | 93 | <15 | 1.5 | X | X |
| Comp. Ex. 7 | X | X | 45 | 20 | 2.0 | X | X |
| Comp. Ex. 8 | ◎ | ○ | 83 | 30 | 6.5 | X | Δ |
| Comp. Ex. 9 | ◎ | ○ | 79 | 45 | 8< | X | Δ |
| Comp. Ex. 10 | ◎ | Δ | 58 | 30 | 4.0 | ○ | Δ |
| Comp. Ex. 11 | ◎ | ○ | 85 | 20 | 3.5 | X | Δ |
| Comp. Ex. 12 | ○ | ○ | 81 | 30 | 7.0 | ○ | Δ |
| Comp. Ex. 13 | ◎ | ○ | 84 | 30 | 4.0 | X | Δ |

TABLE 6

Evaluation results -(2) in Examples 1 to 8

| | Weatherability | Blocking Resistance | Solid Phase Reaction Resistance | Yellowing Resistance (ΔE) | |
|---|---|---|---|---|---|
| | | | | Under Usual Condition (140° C., 30 min.) | Under Excess Heat Condition (150° C., 60 min.) |
| Ex. 1 | ◎ | ◎ | ◎ | 1.4 | 1.8 |
| Ex. 2 | ◎ | ◎ | ◎ | 1.5 | 1.9 |
| Ex. 3 | ◎ | ◎ | ◎ | 1.3 | 1.7 |
| Ex. 4 | ◎ | ○ | ◎ | 1.3 | 1.7 |
| Ex. 5 | ◎ | ◎ | ◎ | 1.4 | 1.7 |
| Ex. 6 | ○ | ◎ | ◎ | 1.5 | 1.8 |
| Ex. 7 | ◎ | ◎ | ◎ | 1.3 | 1.5 |
| Ex. 8 | ◎ | ○ | ◎ | 1.4 | 1.8 |

TABLE 7

Evaluation results -(2) in Comparative Examples 1 to 13

| | Weatherability | Blocking Resistance | Solid Phase Reaction Resistance | Yellowing Resistance (ΔE) | |
|---|---|---|---|---|---|
| | | | | Under Usual Condition (140° C., 30 min.) | Under Excess Heat Condition (150° C., 60 min.) |
| Comp. Ex. 1 | X | ◎ | ◎ | 2.0 | 2.8 |
| Comp. Ex. 2 | ○ | ○ | ○ | 1.3 | 1.7 |
| Comp. Ex. 3 | X | ○ | ◎ | 1.5 | 1.9 |
| Comp. Ex. 4 | ○ | X | X | 1.3 | 1.9 |
| Comp. Ex. 5 | X | ◎ | ◎ | 1.6 | 2.2 |
| Comp. Ex. 6 | X | ◎ | ○ | 1.2 | 1.6 |
| Comp. Ex. 7 | X | ◎ | ○ | 2.0 | 3.6 |
| Comp. Ex. 8 | X | ◎ | ○ | 1.3 | 1.7 |
| Comp. Ex. 9 | X | ◎ | ◎ | 1.4 | 1.8 |
| Comp. Ex. 10 | Δ | X | X | 1.4 | 3.8 |
| Comp. Ex. 11 | X | X | X | 1.5 | 3.9 |
| Comp. Ex. 12 | Δ | X | X | 1.8 | 2.4 |
| Comp. Ex. 13 | X | ○ | ○ | 1.4 | 1.6 |

What is claimed is:

1. A thermosetting powder paint composition for top coating comprising:

(A) a copolymer component which is obtained by radical polymerization in a reaction system containing (a-1) 20 to 60 parts by weight of an ethylenically unsaturated monomer having at least one glycidyl group and at least one unsaturated double bond in the molecule, (a-2) 1 to 30 parts by weight of styrene, and (a-3) 10 to 79 parts by weight of an ethylenically unsaturated monomer having neither carboxyl group nor tert-butyl ester group in the molecule, based on 100 parts by weight of the total amount of the monomers (a-1), (a-2) and (a-3);

(B) a curing agent component which is a linear acid anhydride of an aliphatic divalent carboxylic acid represented by the following general formula (1)

$$HO\text{---}[OC(CH)_mCOO]_n\text{---}H \tag{1}$$

wherein m and n each indicates independently a natural number providing m=4 ~20, n≧=2; and (C) a curing catalyst component composed of a compound represented by the following general formula (2)

$$R_jSnX_k \tag{2}$$

wherein j and k each indicates 0 or a natural number providing j+k=2, X is halogen, OH, OR', SR' or OCOR', R and R' each indicates independently an alkyl group or aryl group.

2. The thermosetting powder paint composition according to claim 1, wherein the equivalent ratio of the functional groups existing in the molecule of curing agent of the curing agent component (B) to the functional groups existing in the molecule of the copolymer of the copolymer component (A) is such that the total amount of carboxyl groups and anhydride groups existing in the molecule of the curing agent is from 0.5 to 2.0 equivalent based on one equivalent of glycidyl group existing in the molecule of the copolymer.

3. The thermosetting powder paint composition according to claim 1, which comprises 0.005 to 3 parts by weight of the curing catalyst component (C) based on 100 parts by weight of the total amount of the copolymer component (A) and the curing agent component (B).

4. The thermosetting powder paint composition according to claim 1, wherein the curing agent component (B) represented by the general formula (1) is a compound derived from at least one compound selected from the group consisting of:

(b-1) azelaic acid, (b-2) sebacic acid, (b-3) eicosanedioic acid, and (b-4) dodecanedioic acid by dehydration condensation.

5. The thermosetting powder paint composition according to claim 1, wherein the curing catalyst composed of the compound represented by the general formula (2) is at least one catalyst selected from the group consisting of:

(c-1) tin(II) hexanoate, (c-2) tin(II) octanoate, (c-3) tin(II) laurate, and (c-4) tin(II) stearate.

6. The thermosetting powder paint composition according to claim 1, wherein the melting point of the linear acid anhydride of an aliphatic divalent carboxylic acid represented by the general formula (1) is in the range of from 40 to 150° C.

7. A process for manufacturing a thermosetting powder paint by using the thermosetting powder paint composition of claim 1, which comprises:

a step of melting and kneading a raw material containing at least the copolymer component (A), the curing agent component (B) and the curing catalyst component (C); and a step of cooling and grinding the material after the step of melting and kneading.

8. The process for manufacturing a thermosetting powder paint according to claim 7, wherein the step of melting and kneading is subjected at a temperature of from 40 to 130° C.

* * * * *

UNITED STATES PATENT AND TRADEMARK OFFICE
CERTIFICATE OF CORRECTION

PATENT NO. : 6,008,301
DATED : December 28, 1999
INVENTOR(S) : Takahisa MIYAWAKI et al.

It is certified that error appears in the above-identified patent and that said Letters Patent is hereby corrected as shown below:

Column 18, line 39, begin new paragraph with "(a-3) 10 to";

line 52, delete " = " (second occurrence).

Signed and Sealed this

Eighth Day of May, 2001

*Attest:*

NICHOLAS P. GODICI

*Attesting Officer*    Acting Director of the United States Patent and Trademark Office